United States Patent [19]

Andrews et al.

[11] 4,051,730

[45] Oct. 4, 1977

[54] CONDITION RESPONSIVE INDICATING INSTRUMENT

[75] Inventors: Richard A. Andrews, Dearborn; Thomas E. Noakes, Birmingham, both of MI

[73] Assignee: H. O. Trerice Co., Oak Park, Mich.

[21] Appl. No.: 688,448

[22] Filed: May 20, 1976

[51] Int. Cl.² ............................................. G01L 7/04
[52] U.S. Cl. .......................................... 73/416; 73/420
[58] Field of Search ............... 73/420, 416, 412, 413, 73/418, 411, 414, 415, 417, 431

[56] References Cited

U.S. PATENT DOCUMENTS

| | | | |
|---|---|---|---|
| 3,141,335 | 7/1964 | Smith | 73/416 |
| 3,201,992 | 8/1965 | Hoff, Jr. | 73/416 |
| 3,434,330 | 3/1969 | Ingham et al. | 73/416 |
| 3,701,284 | 10/1972 | DeMeyer | 73/416 |

*Primary Examiner*—Donald O. Woodiel
*Attorney, Agent, or Firm*—Cullen, Settle, Sloman & Cantor

[57] ABSTRACT

An improved housing for a condition responsive indicating instrument which includes a one-piece, integrally-formed casing having a generally circular front support plate whose front surface is adapted for mounting a dial face thereon and a cylindrical wall integral with said support plate and extending rearwardly therefrom to form a cavity for housing the internal mechanisms of the instrument. A "blow-out" back cover normally seals the back of the cavity but is responsive to excessive internal pressure to break the seal to relieve the pressure. The back cover overlays a dual function diaphram which both forms the rear seal and compensates for temperature variations. A bracket is coupled, either directly or indirectly, between the rear surface of the support plate and the central portion of the back cover to prevent relative axial motion therebetween. The housing includes a shock-isolating mounting plate having a first portion secured to the rear surface of the support plate and a second portion integral with the first portion and spaced therefrom for mounting the internal mechanisms so as to at least partially isolate the mechanisms from external forces applied to the instrument.

30 Claims, 13 Drawing Figures

CONDITION RESPONSIVE INDICATING INSTRUMENT

BACGROUND OF THE INVENTION

1. Field of the Invention

The present invention relates generally to indicating instruments, and more particularly to an improved housing construction for an indicating instrument wherein a Bourdon tube and the mechanical movement associated therewith is protectively enclosed within a housing to insure accurate indications of pressure, temperature or the like.

2. Description of the Prior Art

The prior art includes many different types of condition responsive indicating instruments. Many of these instruments and many of the more common pressure or temperature gauges currently on the market employ a Bourdon tube arrangement together with its associated movement or linkage mechanisms for driving a pointer to indicate an instrument reading on the face of a dial. Many such instruments are subject to error or require complex compensation mechanisms due to the sensitivity of the Bourdon tube and its associated movement or mechanical linkage to pressure ad temperature changes, shock, or the like.

Such instruments are normally enclosed within a steel or die cast aluminum which houses the Bourdon tube and its associated movement within a cavity therein. Some of these instruments have recognized that the cavity may be filled with a liquid to prolonge the life of the gauge, minimize wear on the mechanical movement, prevent internal corrosion, and generally protect the sensitive internal mechanisms. Many of these instruments do not compensate for temperature variations ad the volume of liquid within the cavity can expand to explode or otherwise blow-out the dial and the glass window normally overlaying the dial. This results in an extremely hazardous condition to persons in the vicinity, to the gauge itself, and possibly to the system whose condition is being monitored.

Some fluid-filled gauges contain relatively expensive safety valves for relieving excess pressure or employ some type of temperature compensation means to avoid erroneous instrument readings. These features normally increase the cost of the instrument and still remain subject to mechanical failure.

Some of the indicating gauges of the prior art are designed for use in areas in which the gauges are subject to physical abuse and harsh environmental conditions. Such gages normally are relatively expensive and include additional protective features such as heavy metal casings, shatterproof windows and the ike. When the gauges experience shock or impact, however, the sensitive internal workings ultimately feel the effects thereof with the end result being that erroneous readings may be produced and the delicate movement mechanisms damaged.

The present invention provides a relatively low cost, highly durable housing for such a gauge wherein it may be subject to severe physical abuse and environmental conditions without producing erroneous readings or damaging the internal workings of the instrument.

BRIEF SUMMARY OF THE INVENTION

The present invention relates to an improved housing for an instrument which employs a Bourdon tube and the mechanical movements associated therewith to provide indications of pressure, temperature or the like. The improved housing includes a highly durable, unitary casing having a generally circular blow-out proof front support plate, the front of which is adapted to mount the indicator dial face. A cylindrical wall integral with the front support plate extends rearwardly therefrom to define a central cavity for housing the Bourdon tube and associated mechanical movements therein. A shock-isolating mounting plate has a first portion secured against the rear surface of the front support plate and a second portion which is integral with but spaced from the first portion and adapted to mount the movement mechanisms associated with Bourdon tube in such a manner so as to at least partially isolate or insulate the mechanisms from external forces applied to other portions of the instrument, the housing, or even to the casing itself.

The rear of the housing is closed with a blow-out back cover arrangement so as to form a completely enclosed cavity for housing the Bourdon tube and the mechanical movements associated therewith and which may be filled with a protective liquid for protecting the same. The blow-out back mechanism includes a bracket for mounting the back cover so that there is little or no axial relative otion between the center of the back cover and the front support plate, a dual-purpose diaphragm which serves both as a temperature compensating bladder and as an outer seal to prevent the escape of the liquid from the cavity. The back cover is adapted to normally urge the diaphragm to seal the cavity but is responsive to the build-up of a predetermined unsafe pressure within the cavity to flex outwardly to break the seal and permit the escape of the excess pressure therefrom.

The one-piece casing of the present invention is preferably non-metallic. In the preferred embodiment, it is fiberglass reinforced polypropylene which is highly durable and highly resistant to shock, physical impacts, and severe environmental conditions.

Additionally, the unitary casing of the preferred embodiment may include an integral outer shell to further protect the delicate movements of the instrument within the casing and a threaded forward end which can be used to safely secure a highly durable acrylic plastic window or lens in front of the dial face in a fluid-tight sealing manner.

The diaphragm used with the back cover plate of the present invention serves the dual function of temperature compensation and pressure sealing and includes an inner integral ridge to form the seal between the back cover and the interior of the casing at the point at which they are attached and an outer annular lip which cooperates with a lip-engaging portion of the back cover plate to provide the fluid-tight annular cavity seal under normal conditions. The central portion of the back cover normally urges the lip of the diaphragm into sealing contact with the casing but it is responsive to the attainment of a predetermined unsafe or excessive pressure within the interior of the casing to flex or be displaced outwardly so as to remove the pressure applied to the diaphragm lip thereby breaking the seal and allowing the excess pressure to be relieved.

It is a major feature of this invention to provide an indicating instrument having a highly durable casing which can be subjected to severe physical abuse without damaging the delicate instrument mechanisms mounted therein.

It is another advantage of this invention to provide such a highly durable indicating instrument which is adapted to be filled with a protective fluid and which is provided with an extremely simple blow-out back employing a multi-function diaphragm seal to provide (1) the inner seal with the cover mount (2) the outer seal with the casing, and (3) having a bladder portion therebetween for compensating for changes in the volume of the cavity fluid with temperature.

Other advantages and meritorious features of the present invention will be more fully understood in the following detailed description of the drawings and the preferred embodiment, the appended claims and the drawings which are briefly described hereinbelow.

BRIEF DESCRIPTION OF THE DRAWINGS

FIG. is an overall perspective view of the condition responsive indicating instrument of the present invention.

DESCRIPTION OF THE PREFERRED EMBODIMENT

Figure 1:
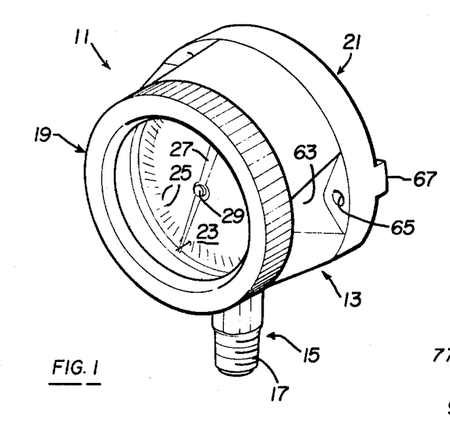

FIG. 1 illustrates the condition-responsive indicating instrument 11 of the present invention. The instrument 11 includes a housing, generally indicated by the reference numeral 13, and an inlet socket 15. The inlet socket 15 has a threaded end 17 adapted for attachment to or communication with the media whose condition is being measured by the instrument 11. The housing assembly or housing 13 includes a window assembly 19 which is threadedly coupled to a casing assembly or casing 21 and positioned over a dial face 23 having a plurality of condition-responsive indicia 25 thereon. The indicia 25 could be numerical, color-coded, or marked in some manner so as to indicate a predetermined range of condition-indicating readings. Since the instrument 11 could be used for measuring pressure, temperature or the like, the charcter and arrangement of the indicia 25 on the dial face 23 would depend upon the given application to which the instrument 11 is put. A pointer 27 is mounted to a pointer shaft 29 for rotation therewith and is positioned above the dial face 23 so as to point to or indicate a given distinct condition-indicating indicia 25 for a corresponding distinct condition in the media being monitored or measured by the instrument 11.

Figure 2:
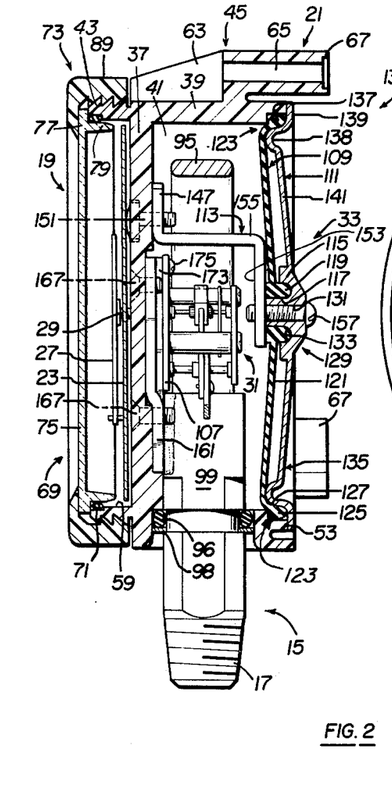
FIG. 2 is a sectional side view of the indicating instrument of the present invention taken along view lines 2—2 of FIG. 3.
Figure 3:
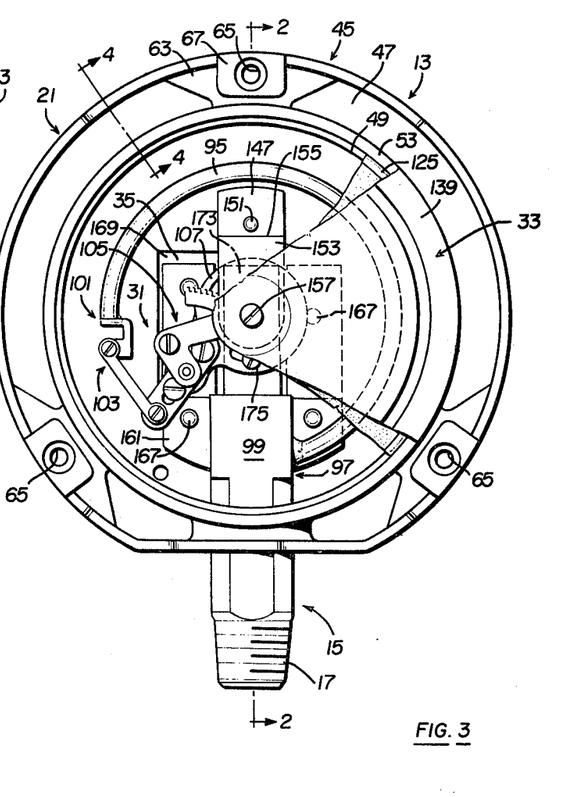
FIG. 3 is a partially cut-away back view of the indicating instrument of the present invention.

FIGS. 2 and 3 show that the housing or housing assembly 13 includes a casing 21, a window assembly 19, internal workings or instrument mechanisms 31, a blow-out back assembly 33, and a shock-isolating mounting assembly or plate 35.

The casing 21, in the preferred embodiment of this invention, is a single, unitary, integrally-formed piece of highly durable, relatively strong material such as fiberglass-reinforced polypropylene or the like which can withstand physical abuse and exposure to extreme environmental conditions without damage thereto. Any similar type of material could be substituted depending upon the end usage of the instrument 11 and the condition to which it will be subjected in operation. The casing 21 includes a relatively strong, generally circular, blow-out proof front support plate 37 and a cylindrical wall 39 integral with the front support plate 37 and extending rearwardly therefrom to form a generally cylindrical cavity or interior portion 41 within the casing 21.

Figure 4:
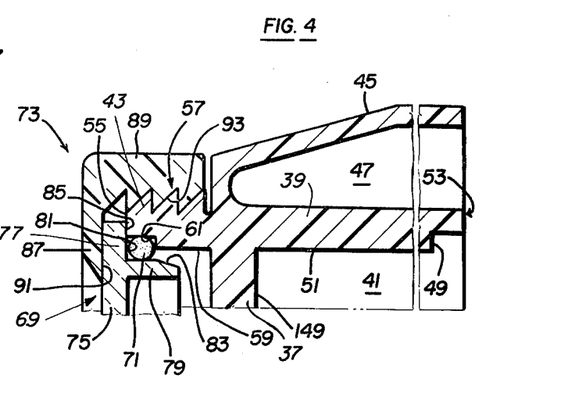
FIG. 4 is a blown-up illustration of a portion of the wall construction of the integral casing of the present invention taken generally along view lines 4—4 of FIG. 3.

The casing 21 further includes a forwardly facing threaded cylindrical wall 43 which encircles the dial face 23 and which is integral with the front support plate 37 and the rearwardly facing cylindrical wall 39. As indicated generally in FIGS. 1, 2 and 3, and more particularly in FIG. 4, the casing 21 may also be provided with an outer wall or shell portion 45 which is integral with the front support plate 37, cylindrical wall 39, and threaded cylindrical wall 43 adjacent the front support plate 37 and extends rearwardly thereof so as to flare generally away from the rearwardly facing cylindrical wall 39 to form a protective air space or pocket 47 between the outer shell 45 and the rearwardly facing cylindrical wall 39. The outer wall 45 is able to absorb physical impact and shock without imparting the greater portion thereof to the remainder of the casing 21 thereby protecting the internal workings 31 of instrument 11 from damage.

The rearwardly facing cylindrical wall 39 includes an inner annular shoulder portion 49 formed in the inner surface 51 thereof adjacent to but displaced from the distal end or rear rim 53 of the cylindrical wall 39 for reasons which will hereinafter be discussed in more detail.

The forwardly facing cylindrical wall 43 has its rear and integral with the front support plate 37 and its distal and or front rim 55 terminating in a relatively flat rim portion 55. At least a portion of the outside surface or radially outer surface of the wall 43 is provided with external threads 57 while the inner surface 59 is provided with an inner annular shoulder 61 extending circumferentially about the inner surface 59 and spaced from the rim portion 55 for sealing purposes as hereinafter described.

The outer wall 45 may also be provided with an anchoring recess, such as indicated generally by the reference numeral 63, and may include an aperture 65 passing through a mounting support portion 67 to enable the instrument 11 to be secured to any given structure available in the environment in which the instrument is to be used.

The window assembly 19 includes a generally circular transparent window 69, an O-ring sealing element 71, and a window-retaining apparatus 73. The window 69 would normally be constructed from a highly durable, rigid, transparent material such as acrylic plastic having high weatherability. The window 69 includes a generally circular central portion 75 which overlays the dial face 23 and is substantially parallel thereto but spaced apart therefrom. The window 69 further includes a radially outer annular portion or flange 77 and a downwardly extending annular lip portion 79. The portion of the window 69 interior of the annular lip 79 is generally referred to as the central portion 75 while the portion of the window radially outward of the lip 79 is generally referred to as the flange portion 77. The flange 77 is integral with the window 69 and formed integrally with the inwardly facing cylindrical wall or lip 79. A radially outwardly facing bight 81 is formed by the intersection of the radially outer annular side 83 of the lip 79 and the dial-facing inner surface 85 of the flange portion 77.

The O-ring sealing element 71 is engagably received between the bight portion 81 of the window 69 and the inner annular shoulder 61 of the forwardly facing cylindrical wall 43 of the casing 21 such that the O-ring sealing element 71 may be compressed to form a weather proof seal therebetween.

The window-retaining apparatus 73 is generally formed in the shape of a lid having the central portion removed. The apparatus 73 includes an annular ring portion 87 whose plane is substantially parallel to the plane of the window 69 and dial face 23 and the under surface or inner surface 91 of the ring portion 87 is adapted to operably engage at least the radially outer portion of the upper surface of the flange 77 and possibly an annular portion of the central window portion 75 as well. A rim portion 89 is generally perpendicular to the ring portion 87 and integral therewith and is provided with internal threads 93 adapted for threadedly engaging the external threads 57 of the forwardly facing cylinder wall 43 such that the window-retaining apparatus 73 may be rotated to screw it on so as to cause the inner surfaces 91 to bear against the radially outer portion of the window 69 so that the O-ring sealing element 71 which is inserted between the bight 81 and the inner annular shoulder 61 is compressed to form a wheathertight seal between the casing 21 and the window 69.

The internal workings or internal instrument mechanisms 31 are housed or enclosed within the cavity 41. The mechanisms 31 normally include a Bourdon tube, spring or element 95 having one end 97 communicating with the interior portion of the closed end 99 of the socket inlet 15 which serves as the movement base so as to be exposed to the media whose condition is being measured. A pressure tight seal may be formed at the junction of the tube 95 with the closed end 99 of the socket 15 by means of a silver braised solder connection or some similar seal. The opposite end or tip 101 of the Bourdon tube 95 is coupled via link 103 to a conventional mechanical movement or mechanical linkage assembly 105 which may be used to rotatably drive the pointer shaft 29. The combination of the Bourdon tube 95, the mechanical linkage assembly 105, and the driven shaft 29 is well-known in the art and neither the specific construction nor the operation thereof forms a part of the present invention.

As conventionally known, the Bourdon tube 95 may be made of phosphorus bronze, alloy steel, stainless steel or the like and the mechanical movement or linkage assembly 105 may include conventional stainless steel bushings, springs, a delrin sector gear, and a shaft 29. Typical Bourdon tube-mechanical movement combination may be found in U.S. Pat. Nos. 2,333,793 and 3,191,438 which are incorporated by reference herein, however, many similar teachings exist in the prior art. The only feature of the mechanical movement or linkage assembly 105 worthy of special note in the description of the present invention is the mechanical movement base plate 107 which will be used to mount the linkage assembly 105 so as to at least partially isolate it from external shocks, impacts, and the like, as hereinafter described.

The interior or cavity 41 of the casing 21 is norally adapted to be filled with a protective liquid such as glycerin, a glycerin and water mixture, silicone, or the like. The protective liquid prolongs the life of the gauge, minimizes wear on the various parts of the linkage assembly 105, dampens movement under severe pulsation conditions, prevents internal corrosion, prevents contamination of the mechanical movement 105 by condensation and environmental conditions, permanently lubricates, and prevents deterioration of the dial face 23 and fogging of the window 69.

The movement base or closed end 99 of the socket inlet 15 is sealed to the casing 21 by means of an O-ring sealing element 96. In the event external forces are applied to the casing 21 which might tend to force a compression on one side of the O-ring sealing element 96, a pair of semi-circular stainless steel back-up ring elements 98 are provided to prevent the opening of the O-ring seal regardless of the relative movement between the socket inlet 15 and the casing 21.

The blow-out back assembly 33 is adapted to sealably close, under normal conditions, the rear of the cavity 41 so as to prevent the escape of the protective fluid therefrom. The back assembly 33 includes a generally circular, dish-shaped diaphragm 109, a generally circular, resiliently firm back cover plate 111, and, in a first embodiment, a generally squared, S-shaped or stair-step-shaped bracket element 113.

The diaphragm 109 is formed of a generally resilient, flexible elastomeric material such as natural rubber, synthetic rubber, or the like and is adapted to serve a dual function. The diaphragm 109 serves to (1) form a fluid tight seal about the back of cavity 41 to prevent the escape of the protective liquid therefrom and (2) to serve as a temperature compensating element which is capable of expanding and contracting in response to variations in the volume of fluid within the cavity 41 with corresponding variations in temperature.

The diaphragm 109 includes a central portion 115 having a central aperture 117 therethrough and a raised annular ring or sealing ridge 119 disposed about the outer mouth of the aperture 117. The diaphragm 109 further includes an intermediate annular bladder portion 121 which is adapted to expand and contract to compensate for variations in the volume of the liquid contained in the cavity 41 with variations in temperature. The intermediate bladder portion 121 is integral with the central portion 115 and with a radially outer lip portion 123. The radially outer lip portion 123 includes a O-ring type peripheral lip or ring 125 and a curved portion 127 radially adjacent thereto such that the concave face of the dish-shaped diaphragm 109 faces outwardly from the rear of the housing 13.

The back cover plate 111 is a single unitary construction of resiliently firm plastic material such as polypropylene or the like and includes an inner central portion 129 having a cover plate mounting aperture 131 and an annular recess or slot formed on the side of the cover plate 111 which faces the interior 41 and the diaphragm 109. The back plate 111 further includes a radially outer peripheral portion 133 which includes lip-engaging means 135 thereon. The lip-engaging means includes an annular ridge or hump-shaped portion 138 spaced around the inner surface of the annular outer portion 133 and an annular flange 139 radially outward of the hump-shaped portion 137. The cover plate 111 further includes a resiliently firm intermediate portion 141 which normally urges the lip-engaging means 135 into a first annular sealing position with respect to the diaphram 109 as hereinafter described with reference of FIGS. 8 and 9 but which is adapted to flex outwardly in response to the attainment of a predetermined unsafe pressure condition within the cavity 41 so as to displace the lip-engaging outer portion 135, 138 from the first sealing position to allow the seal to be broken and the excess pressure to be relieved as hereinafter described.

Figure 8:
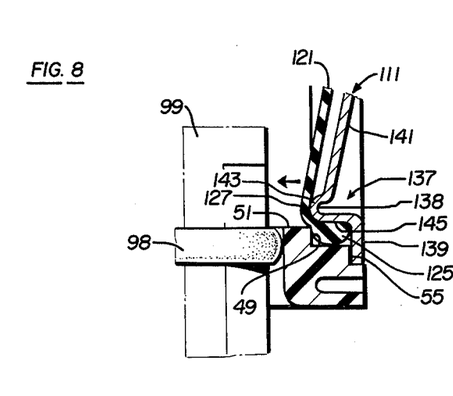
FIG. 8 is a fragmentary blown up illustration of the annular peripheral seal normally formed about the back of the indicating instrument of the present invention.

As illustrated in FIG. 8, the cover plate 111 is shown in the normal first sealing position. The intermediate portion 141 urges the hump-shaped portion 138 in the direction indicated by the arrow causing the peak 143 of the hump 138 and the surface area immediately adjacent thereto to contact the curved portion 127 immediately adjacent to the peripheral lip 125. The radially outer side 145 of the hump-shaped portion 138 bears against the lip 125 and radially compresses the lip 125 against the annular shoulder 49 to form a fluid-tight seal between the lip portion 123 and the inner surface 51 of the cylindrical wall 39 and the shoulder portion 49 thereof. While in the normal sealing position, the underside of the outer annular flange 139 is disposed over the distal end 55 of the rearwardly facing cylindrical wall 39.

Figure 9:
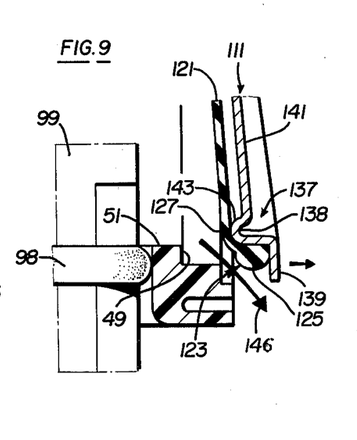
FIG. 9 is a fragmentary blown-up illustration of the peripheral seal portion of the back of the instrument in the blown-out pressure-releasing state.

When the pressure within the cavity 41 has attained some predetermined unsafe value the resiliency of the intermediate portion 141 of the cover plate 111 will allow the cover plate 111 to flex outwardly in the direction shown by the arrow in FIG. 9 thereby displacing the lip-engaging means 137 rearwardly away from the normal sealing position. This outward flexing of the cover plate 111 away from the interior 41 of the housing 13 allows the fluid within the cavity 41 to lift the lip portion 123 away from the shoulder 49 so as to break the seal and allow fluid to escape from the interior 41 as indicated by the flow arrow 146 so as to relieve the excess or unsafe pressure therein.

The cover plate 111 and diaphragm 109 are adapted to be operatively mounted to normally seal the back of the casing 21 by the bracket 113. In the embodiment of FIGS. 2 and 3, bracket 113 is generally stair step-shaped and includes a first end having a first step or first parallel member 147 which is relatively flat and which is adapted to be rigidly secured to and flush against the interior or rear surface 149 of the front support plate 37 by means of a bolt or similar fastening device 151. The opposite or front surface of the support plate 37 has the dial face 23 mounted thereon. The opposite end or second step 153 of the bracket 113 is substantially parallel to the first step 147 and is adapted to be secured to the cover plate 111 and diaphragm 109 as hereinafter described. The intermediate or interconnecting portion 155 is integral with and generally perpendicular to the first step 147 and the second step 153 and is adapted to position the second step 153 centrally over the rear opening of the cavity 41.

The second step 153 is positioned substantially parallel to the rear surface 149 of the front support plate 37 and is adapted to mount the cover plate 111 and diaphragm 109 as follows. The central portion 129 of the cover plate 111 is positioned immediately over the central portion 115 of the diaphgram 109 so that the sealing ridge 119 of the diaphragm 109 is compressably received within the annular recess 133 which is formed about the inner surface of the central portion 129 of the cover plate 111. A bolt or similar fastening device 157 is passed through the central aperture 131 of the central portion 129 of the cover plate 111 to threadedly engage the second step 153 so as to secure the cover plate 111 and diaphragm 109 into operable position over the back of the cavity 41 such that the sealing ridge 119 forms a fluid-tight seal between the cavity 41 and the cover plate 111 about the central fastening point.

In operation, the bracket 113 normally secures the diaphragm 109 and cover plate 111 centrally over the back of the interior 41 such that the intermediate portion 141 of the cover plate 111 forces the lip engaging means 135 against the lip portion 123 of the diaphram 109 to form a pressure tight seal and prevent the escape of the protective liquid from the interior 41. When a predetermined unsafe pressure is attained within the interior 41, the intermediate portion 141 of a cover plate 111 is adapted to flex outwardly so as to break the seal and allow the excess pressure to escape in a safe manner.

The bracket 113 rigidly secures the blow-out back assembly 33 to the front support plate 37 to prevent or at least minimize relative axial movement in a direction generally perpendicular to the front support plate 37. Since the cylindrical wall 39 against which the seal is formed is integral with the front support plate 37, the back assembly 33 will move axially with the front support plate 37 when forces are applied to the housing 13 so as to maintain the seal. If internal pressure causes the cover plate 111 to blow or flex outwardly to relieve the pressure, the bracket 113 secures the cover plate 111 to the front cover plate 37 so as to prevent its becoming a projectile under normal blow-out conditions.

Figure 5:
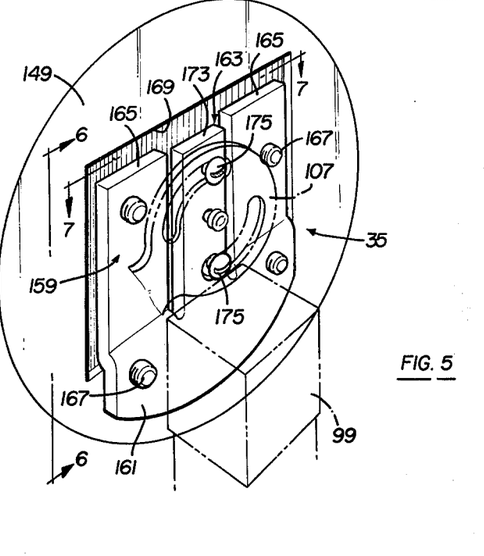
FIG. 5 is a perspective illustration of the shock-isolating mounting plate of the present invention which is used to mount the movement mechanisms to isolate same from external forces applied to the instrument housing.

The shock-isolating mounting assembly 35 of the present invention includes a first portion 159 adapted to be rigidly secured flush against the rear surface 149 of the front support plate 37, a base portion 161 which is integral with the first portion 159 and which has one surface adapted to be weldably secured to the closed end 99 of the socket 15 and its opposite surface adapted to be secured to the rear surface 149 of the front support plate 37. A second portion 163 is integral with the base portion 161 and is adapted to mount the mechanical movement or linkage assembly 105 so as to at least partially isolate it from the external forces applied to the housing 13.

Figure 6:
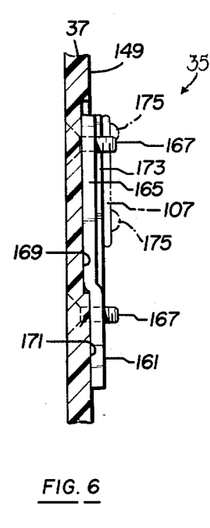
FIG. 6 is an end view of the mounting plate of FIG. 5 taken along view lines 6—6 thereof.
Figure 7:
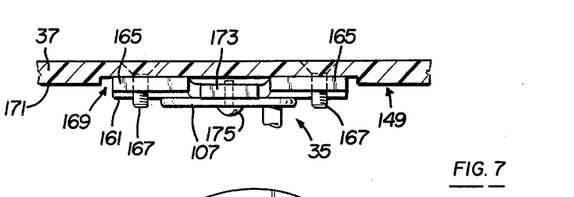
FIG. 7 is a top view of the mounting plate of FIG. 5 taken along view lines 7—7 thereof.

The first portion 159 includes a pair of relatively flat, substantially parallel, elongated members 165 which are adapted to be rigidly secured flush against the rear surface 149 of the front support plate 37 by means of bolts or similar fastening devices 167. The first pair of members 165 may be secured in a flush manner against the surface 149 within a generally rectangular recess 169 provided in the rear surface 149 of the support plate 37 and the first pair of members 165 define a first plane which is substantially parallel to the rear surface 149. The base 161 is integral with the first pair of elongated members 165, parallel thereto, and is adapted to be secured flush against the raised portion 171 of the rear surface 149 about the recess 169 so as to define a second plane substantially parallel to the plane of the first pair of members 165 but displaced therefrom. The base 161 is adapted to be secured flush against the raised portion 171 by means of bolts or similar fastening means as indicated by the reference numeral 167.

The second portion 163 of the mounting plate assembly 35 includes a third, substantially flat, elongated member 173 which is substantially parallel to but displaced from the first pair of members 165 so as to define a different plane. The third member 173 is integral with the base 161 and extends outwardly therefrom. It is disposed between the first pair of members 165 and located centrally over the recess 169. The third member 173 is adapted to be attached to the mechanical movement base plate 107 of the linkage assembly 105 by screws or some similar fastening means 175 so as to suspend the linkage assembly 105 within the cavity 41 and isolate the relatively sensitive mechanical movement or linkage assembly 105 and the Bourdon tube 95 associated therewith from the severe external forces, shocks, impacts, and environmental conditions experienced by the housing 13 or even by the casing 121. The shock-isolation feature provided by the mounting plate assembly 35 prevents damage to the mechanical movement 105, and greatly prolonges the life of the instrument and accuracy of the readings. The instrument 11 may be subjected to severe physical abuse. It may be walked on, jumped on, twisted, and subjected to nearly any type of adverse physical treatment or severe environmental condition without damage to the instrument itself.

Figures 10, 11, 12, 13:
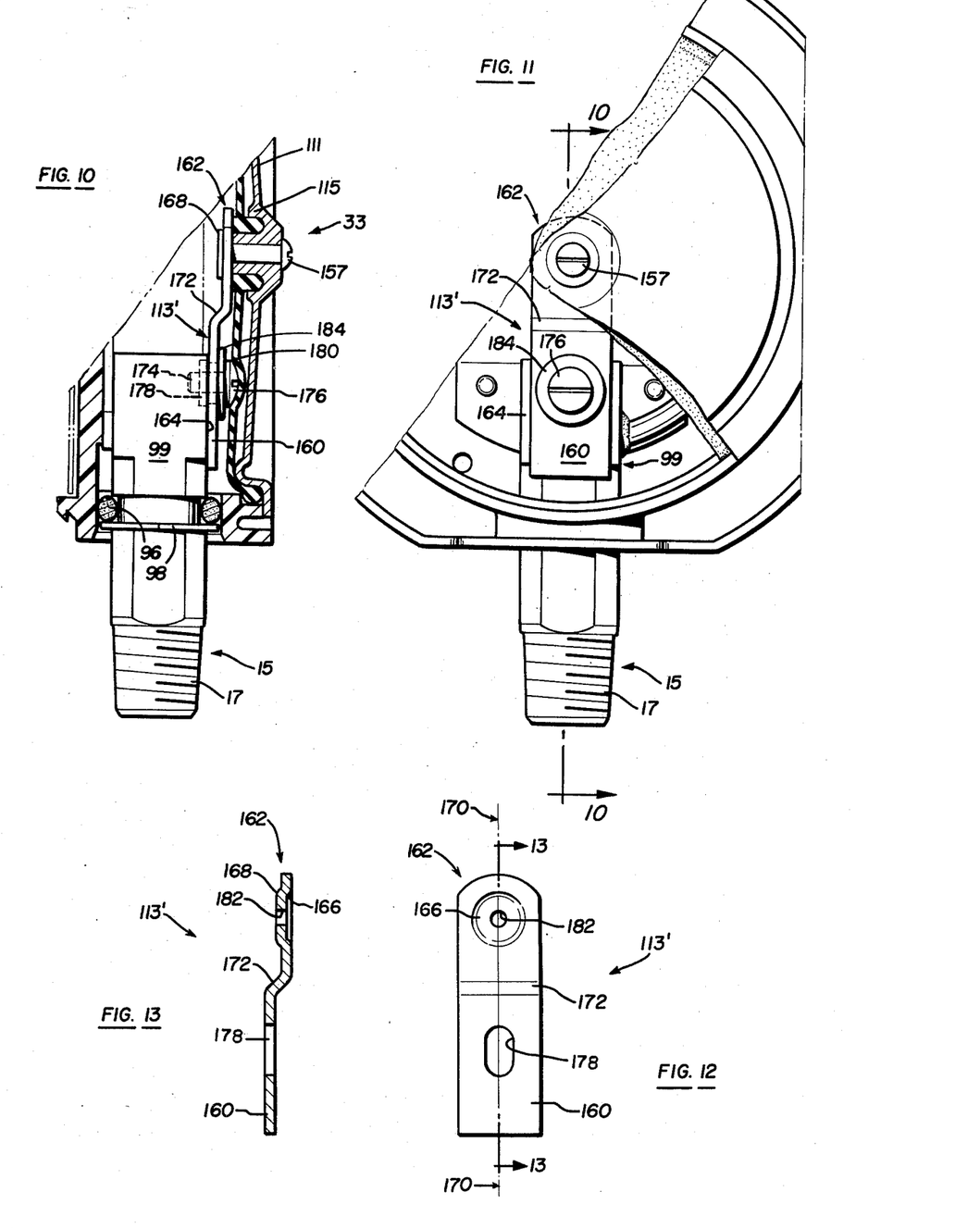
FIG. 10 is a partially cut-away sectional side view of an alternate embodiment of the indicating instrument of the present invention taken along view lines 10—10 of FIG. 11 to illustrate an alternate means for mounting the back cover assembly.
FIG. 11 is a partially cut-away back view of an alternate embodiment of the indicating instrument of the present invention.
FIG. 12 is an elevational view of the alternate back-mounting bracket illustrated in FIGS. 10 and 11.
FIG. 13 is a section view of the back-mounting bracket of taken on the line 13—13 of FIG. 12.

FIGS. 10 and 11 illustrate an alternate embodiment of the indicating instrument 11 of the present invention and corresponding reference numerals designate corresponding parts in the embodiment of FIGS. 2 and 3, respectively.

The embodiment of FIGS. 10-13 shows a modified bracket 113' for mounting the back assembly 33 to the instrument 11. A first end portion 162 of the bracket 113' is adapted to be secured to blow-out back assembly 33 and the second end portion 160 is adpated to be secured to the movement base 99. By mounting the second end portion 160 fixedly to the rear face 164 of the movement base 99, the bracket 113' insures that the back cover plate 111 cannot become a projectile even under extreme blow-out conditions which might break off the portion of the front support plate 37 to which the stair step-shaped bracket 113 is secured. Since the movement base 99 has its opposite face welded to the base portion 161 of the mounting assembly 35 which is fixedly secured to the front support plate 37, relative axial movement between the support plate and the back assembly 33 is minimized so as to maintain the seal under axial stress.

The first end portion 162 is provided with a circular recess 166 whose diameter is the area which the central portion 115 of the diaphragm 109 seals and an integral internally threaded nut-like formation or member 168 which includes a threaded bore 182. The threaded bolt member 157 extends through the recess 166 and the nut-like member 168 and threadedly engages the bore 182 for securing said first end portion 162 to the back assembly 33.

The first end portion 162 defines a first plane and lies flush against the central portion 115 of the diaphgram 109 and the second end portion 160 generally defines a second plane parallel to the first plane and axially displaced inwardly thereof. The second end portion 160 is adapted to lie flush against the face 164 of the movement base 99 to be secured thereto. The first end portion 162 is integrally connected to the second end portion 160 by an intermediate step portion 172.

The movement base 99 is provided with an internally threaded bore 174 adapted to receive a screw fastener 176. An elongated slot 178 is provided in the second end portion 160 for receiving the wider diametered base portion of a shoulder washer 180 whose lesser diametered portion extends through in said second end portion 160 and a spring washer 184 disposed thereover. The screw 176 passes through the shoulder washer 180, the spring washer 184, and the slot 178 to threadedly engage the bore 174 for securing the second end portion 160 of the bracket 113' fixedly to the movement base 99. The elongated slot 178 may allow the bracket 113' and the back assembly 33 secured thereto to move radially relative to the movement base 99, at least in the direction of the longitudinal slot axis 170 which is normal to the direction of axial motion.

The spring washer 184 provides sufficient friction to position the bracket 113' for easy assembly such that the bracket 113' can move parallel to the plane of the back assembly 33 to maintain the seal while preventing the back cover 111 from becoming a projectile under even the worst possible conditions.

With this detailed description of the specific apparatus used to illustrate the present invention and the operation thereof, it will be obvious to those skilled in the art that various modifications can be made in the illustrated embodiment without departing from the spirit and scope of the present invention which is limited only by the appended claims.

We claim:

1. In a condition responsive indicating instrument for measuring pressure, temperature or the like, said instrument having an inlet means for communicating with a media whose conditions is to be measured, a Bourdon tube coupled to said inlet means and responsive to a predetermined distinct condition of said media for effecting a corresponding predetermined distinct displacement indicative thereof, mechanical linkage means coupled to said Bourdon tube and including a rotatable shaft, said linkage means being responsive to each predetermined distinct condition-indicative displacement for rotating said shaft through a corresponding predetermined distinct angle indicative thereof, cavity-defining means forming a cavity for enclosing said Bourdon tube and said linkage means, said cavity adapted to be filled with a protective liquid, a dial face having a predetermined range of condition-indicating indicia thereon and a pointer secured to said shaft for rotation therewith and disposed in front of said dial face so as to indicate a predetermined distinct condition-indicative indicia on said dial face which corresponds to said predetermined distinct angle of rotation of said shaft, an improved instrument housing comprising a unitary, integrally formed casing having a generally circular front support plate whose front surface is adapted to mount said dial face and whose rear face is adapted to form one end of said cavity-defining means and a cylindrical wall integral with said support plate and extending rearwardly therefrom to form the sides of said cavity-defining means, said improved housing further including back cover means normally engageable with the rearwardly facing portion of said cylindrical wall and forming the opposite end of said cavity-defining means to prevent the escape of the protective liquid from said cavity but responsive to the attainment of a predetermined unsafe pressure condition within said cavity for disengaging said cylindrical wall and relieving the excess pressure out of the back of said instrument without damage thereto, said back cover means comprising a resilient diaphragm normaly closing and sealing said opposite end of said cavity defining means to prevent the escape of the protective liquid from said cavity and a back cover plate normally spaced from said cavity by said diaphragm and engageable with said diaphragm to provide support therefor when said diaphragm is subjected to a safe pressure condition within said cavity, and means for securing said diaphragm and said cover plate in operable position relative to said cavity and to said casing.

2. The improved instrument of claim 1 wherein said resilient diaphragm is of generally circular configuration and has a flexible portion adapted to engage said back cover means, said diaphragm including an integral annular seal on the other periphery thereof.

3. The improved instrument of claim 1 wherein said resilient diaphragm is of generally circular configuration and includes a flexible and expandable portion which is adapted to be subjected to the pressure condition of the protective liquid within said cavity, the expansion of said flexible portion of the diaphragm being limited by said back cover plate during a safe pressure condition within said cavity.

4. The improved instrument of claim 1 wherein said disphragm and said back cover plate being responsive to the attainment of the predetermined unsafe pressure condition within said cavity such that said resilient diaphragm is displaced away from said cavity-defining means to break the seal therebetween thus relieving the pressure of the protective liquid within said cavity, said back cover plate including portions which are also displaced away from said cavity-defining means upon the attainment of the unsafe pressure condition within said cavity.

5. The improved instrument of claim 1 wherein said inlet means is in the form of a tubular socket which is provided with an annular shoulder, said housing having an opening through which said tubular socket extends, said housing having an annular cavity exteriorly of said opening which surrounds said socket, an O-ring seal surrounding said socket and located within said cavity, and an annular back-up ring surrounding said socket and engageable on one side with said shoulder and on the other side with said O-ring seal to prevent the opening of said O-ring seal regardless of the relative movement between said socket and said housing.

6. In a condition responsive indicating instrument for measuring pressure, temperature or the like, said instrument having an inlet means for communicating with a media whose conditions is to be measured, a Bourdon tube coupled to said inlet means and responsive to a predetermined distinct condition of said media for effecting a corresponding predetermined distinct displacement indicative thereof, mechanical linkage means coupled to said Bourdon tube and including a rotatable shaft, said linkage means being responsive to each predetermined distinct condition-indicative displacement for rotating said shaft through a corresponding predetermined distinct angle indicative thereof, cavity-defining means forming a cavity for enclosing said Bourdon tube and said linkage means, said cavity adapted to be filled with a protective liquid, a dial face having a predetermined range of condition-indicating indicia thereon and a pointer secured to said shaft for rotation therewith and disposed in front of said dial face so as to indicate a predetermined distinct condition-indicative indicia on said dial face which corresponds to said predetermined distinct angle of rotation of said shaft, an improved instrument housing comprising a unitary, integrally formed casing having a generally circular front support plate whose front surface is adapted to mount said dial face and whose rear face is adapted to form one end of said cavity-defining means and a cylindrical wall integral with said support plate and extending rearwardly therefrom to form the sides of said cavity-defining means, said improved housing further including back cover means normally engageable with the rearwardly facing portion of said cylindrical wall and forming the opposite end of said cavity-defining means to prevent the escape of the protective liquid from said cavity but responsive to the attainment of a predetermined unsafe pressure condition within said cavity for disengaging said cylindrical wall and relieving the excess pressure out of the back of said instrument without damage thereto, said back cover means including a generally circular, dish-shaped diaphragm adapted to seal said opposite end of said cavity; a generally circular, resiliently firm back cover plate overlaying said diaphragm such that the outer radial portion thereof is normally disposed in a first annular sealing position with respect to the rearward end of said cylindrical wall for urging said diaphragm to effect said seal but responsive to the attainment of said predetermined unsafe pressure condition within said cavity such that said outer radial portion is displaced away from said first sealing position to break the seal and relieve excess pressure; and means for mounting said diaphragm and said back cover plate in operable position with respect to said cylindrical wall.

7. The improved instrument of claim 6 further characterized in that said mounting means includes a bracket having one end secured to the rear face of said support plate and the opposite end secured to the center portion of said back cover plate for preventing relative axial movement therebetween.

8. The improved instrument of claim 7 further characterized in that said bracket is a generally rectangular, stair-step-shaped integral member, one step of which is adapted to be rigidly secured flush against said rear face of said support plate, whose intermediate portion is adapted to position said second step centrally over said cavity, and whose second step is substantially parallel to said first step and said rear face and is adapted to support the cavity-facing center portions of said diaphragm and said back cover plate and to be rigidly secured thereto.

9. The improved instrument of claim 6 further characterized in that said dish-shaped diaphram includes a central portion adapted for sealing attachment about said mounting means, an outer radial lip portion about the peripheral edge of said diaphram adapted to be compressed radially outward and toward said support plate by said back cover plate to attain said first annular sealing position, and an intermediate annular flexible bladder portion integral with said central portion and said lip portion for expanding and contracting to compensate for variations in the volume of said liquid with temperature changes.

10. The improved instrument of claim 9 further characterized in that said back cover plate includes a central portion having a central aperture therethrough for coupling said cover plate to said mounting means and an annular slot formed circumferentially around said aperture on the side of said cover plate facing said support plate and wherein the central portion of said diaphragm includes a central diaphragm aperture and a raised annular sealing ridge encircling same for being received within said annular slot in said cover plate for forming a liquid-tight compression seal when said cover plate is secured to said mounting means.

11. The improved instrument of claim 9 further characterized in that said back cover plate incudes a central portion adapted to be secured to said mounting means, an intermediate portion integral with said central portion and extending radially outward therefrom, said intermediate portion flaring from said central portion in a direction generally toward said support plate, and an annular outer portion integral with said intermediate portion and having lip-engaging means thereon, said intermediate portion normally maintaining said annular outer portion in said first sealing position such that said lip-engaging means compresses the lip portion of said diaphragm radially outward against an inside surface of said cylindrical wall and toward said support plate to engage a shoulder portion formed on the inside surface of said cylindrical wall for effectively forming a liquid-tight seal therebetween.

12. The improved instrument of claim 11 further characterized in that said lip-engaging means includes an annular ridge having a convex portion facing said support plate such that the peak of said ridge urges the outer relatively thin portion of said lip portion radially adjacent to and inwardly of the peripheral lip itself toward said support plate, the radially outer curved side of said ridge urges said lip toward said inside shoulder portion and radially outward against the inside surface of said cylindrical wall to effect said seal, and an outer peripheral flange substantially parallel to said support plate for urging said lip toward said inside shoulder portion in a direction normal to the plane of said support plate and for being disposed in a flush manner over the outer end of said cylindrical wall.

13. The improved instrument of claim 12 further characterized in that said intermediate portion is inherently resilient and is responsive to pressure applied thereto and to said lip-engaging means by said bladder portion and said lip portion of said diaphram when the pressure within said cavity reaches said predetermined unsafe condition for flexing in a direction away from said support plate such that the lip-engaging means of said outer radial portion is displaced from said first annular sealing position to break said seal.

14. The improved instrument of claim 11 further characterized in that said mounting means includes a generally square, S-shaped bracket having a first parallel member rigidly anchored to the rear face of said support plate, a second parallel member rigidly secured in a sealed manner to the central portions of said diaphram and said back cover plate, and its interconnecting member being adapted to position the second member centrally over the back of said cavity, said bracket being constructed of a relatively rigid material and being adapted to secure said support plate to said back cover plate to prevent relative motion therebetween.

15. The improved instrument of claim 11 further characterized in that said mounting means includes a stair-step-shaped bracket having a first parallel member rigidly anchored to the rear face of said inlet means, a second parallel member rigidly secured in a sealed manner to the central portions of said diaphragm and said back cover plate, and its interconnecting member being adapted to position the second member centrally over the back of said cavity, said bracket being constructed of a relatively rigid material and being adapted to secure said inlet means to said back cover plate to prevent said back cover from becoming a projectile under extreme blow-out conditions and to normally maintain said seal.

16. The improved instrument of claim 6 further characterized in that said improved housing further includes a shock-isolating mounting plate having a first portion adapted to be rigidly anchored to the rear face of said support plate and a second portion integral therewith but spaced therefrom for mounting said linkage means thereon so as to at least partially isolate same from the external forces applied to said housing.

17. The improved instrument of claim 16 further characterized in that said shock-isolating mounting plate includes a base portion adapted to be rigidly secured to said inlet means, said first portion is integral therewith and includes a pair of substantially flat elongated members defining a first plane parallel to said support plate, said pair of elongated members being adapted to be rigidly secured flush against a portion of the rear face of said support plate, and said second portion is a third elongated member having a free end and an opposite end which is integral with said base portion, said third member defining a plane parallel to but spaced from said first plane and being adapted to mount said linkage means thereon so as to suspend said linkage means within said cavity to at least partially isolate same from the forces experienced by the exposed portions of the housing.

18. The improved insrument of claim 16 further characterized in that said casing includes a threaded cylindrical wall integral with said support plate and extending forwardly therefrom to encircle said dial face and said housing means further includes a window for overlaying said dial face, an O-ring sealing means disposed between said window and said threaded cylindrical wall for forming a weatherproof seal therebetween, and window-securing means having a threaded portion adapted to operably engage the threads of said threaded cylindrical wall to secure said window over said dial face in a seal-forming manner.

19. The improved instrument of claim 16 further characterized in that said housing means further includes an over shell-like wall integral with the inner cylindrical wall adjacent said support plate, said shell-like wall extending rearwardly from said support plate and flaring radially outward therefrom to encircle said inner cylindrical wall and provide an annular airspace therebetween to further protect the apparatus enclosed within said cavity, said shell-like wall further including means for anchoring said instrument.

20. The improved instrument of claim 6 further characterized in that said mounting means includes a bracket having one end secured to the rear face of said inlet means and the opposite end secured to the center portion of said back cover plate for preventing the back cover from becoming a projectile under severe blow-out conditions.

21. The improved instrument of claim 20 further characterized in that said one end includes an elongated slot for permitting relative radial movement between said inlet means said back cover in a direction generally parallel to the longitudinal axis of the slot.

22. The improved instrument of claim 21 further characterized in that said inlet means is rigidly coupled to said front support plate and said bracket minimizes axial relative movement between said front support plate and said back cover.

23. The improved instrument of claim 22 further characterized in that said one end defines a first plane, said second end defines a second plane parallel to said first plane and displaced rearwardly thereof, said bracket includes a stairstep intermediate portion integrally connecting said ends, said bracket further including means for securing said one end to said inlet means and means for securing said second end through said elongated slot to said back cover plate.

24. In a condition responsive indicating instrument which includes a dial having a plurality of indicia thereon, pointer means adapted to indicate a distinct one of said indicia for each correspondingly distinct condition measured by the instrument, inlet means coupled to the media whose condition is being measured, a Bourdon element coupled to said inlet means and responsive to a given condition of said media for effecting a predetermined motion indicative thereof and a mechanical movement coupled between said Bourdon element and said pointer means for translating the condition-indicative motion of said Bourdon element into corresponding dial indications by said pointer means, an improved housing means including a casing having a support plate, said dial being secured to one side of support plate, mounting means secured to the opposite side of said support plate for mounting said mechanical movement so as to isolate same from external forces applied to said casing, said mounting means including a one-piece integral mounting plate having a base portion with first, second and third elongated members extending in a first direction therefrom, said first and third members defining a first plane and being rigidly secured flush against said opposite side of said support plate for securing said mounting plate to said casing, said base plate being rigidly secured to a portion of said inlet means for anchoring same, and said second elongated member being disposed between said first and third members and defining a second plate parallel to but spaced away from said first plane, said second member being adapted to be secured to said mechanical movement for suspending same away from said casing to isolate said mechanical movement from external forces applied to the casing.

25. The improved instrument of claim 24 further characterized in that said opposite side of said support plate includes a recess having a raised portion thereabout, said recess being adapted to receive said first and third members to be secured flush against the bottom of said recess and said base portion being adapted to be secured flush against said raised portion in said second plane to position said second member spacially over said recess.

26. The improved instrument of claim 24 wherein said inlet means is in the form of a tubular socket which is provided with an annular shoulder, said housing having an opening through which said tubular socket extends, said housing having an annular cavity exteriorly of said opening which surrounds said socket, an O-ring seal surrounding said socket and located within said cavity, and an annular back-up ring surrounding said socket and engageable one one side with said shoulder and on the other side with said O-ring seal to prevent the opening of said O-ring seal regardless of the relative movement between said socket and said housing.

27. In a condition responsive indicating instrument which includes a dial having a plurality of indicia thereon, pointer means adapted to indicate a distinct one of said indicia for each correspondingly distinct condition measured by the instrument, inlet means coupled to the media whose condition is being measured, a Bourdon element coupled to said inlet means and responsive to a given condition of said media for effecting a predetermined motion indicative thereof and a mechanical movement coupled between said Bourdon element and said pointer means for translating the condition-indicative motion of said Bourdon element into corresponding dial indications by said pointer means, an improved housing means including a casing having a support plate, said dial being secured to one side of support plate, mounting means secured to the opposite side of said support plate for mounting said mechanical movement so as to isolate same from external forces applied to said casing, said support plate being substantially circular in shape, said casing including said support plate is a one-piece, integrally-formed construction having a cylindrical wall portion extending rearwardly from said opposite side of said support plate to define an interior portion adapted to house said mounting means, said Bourdon element and said mechanical movement, said interior portion also being adapted to be filled with a protective fluid, said housing means further including sealing means operatively engaging the rear of said wall portion for preventing the escape of said protective fluid from said interior portion, the fluid being confined within said interior portion by said circular support plate, said cylindrical wall portion and said sealing means, said one-piece casing further including a second cylindrical wall integral with said support plate and extending forwardly therefrom to encircle said dial, said second wall having an externally threaded outer surface portion and an annular shoulder disposed on the inner surface thereof, said housing means further including a relatively durable substantially transparent window overlaying said dial, said window having a generally circular portion substantially parallel to and spaced apart from said support plate, said window including an annular lip disposed radially in from the periphery of said circular window portion and toward said support plate such that a radially outer annular bight is formed between the radially outer side of said annular lip and the dial-facing, radially peripheral surface of said circular window portion, said housing means further including a resilient O-ring seal and a window securing means having an annular ring portion dimensioned to at least partially overlay the non-dial facing, radially peripheral surface of said circular window portion for retainably engaging same and an internally threaded annular rim substantially normal to and integral with said ring portion for operatively engaging the exteranl threads of said second casing wall to move said ring portion and the window engaged thereby toward said support plate to compress said O-ring seal between the outer bight of said lip and said inner annular shoulder to provide a weatherproof seal therebetween.

28. In a condition responsive indicating instrument which includes a dial having a plurality of indicia thereon, pointer means adapted to indicate a distinct one of said indicia for each correspondingly distinct condition measured by the instrument, inlet means coupled to the media whose condition is being measured, a Bourdon element coupled to said inlet means and responsive to a given condition of said media for effecting a predetermined motion indicative thereof and a mechanical movement coupled between said Bourdon element and said pointer means for translating the condition-indicative motion of said Bourdon element into corresponding dial indications by said pointer means, an improved housing means including a casing having a support plate, said dial being secured to one side of support plate, mounting means secured to the opposite side of said support plate for mounting said mechanical movement so as to isolate same from external forces applied to said casing, said support plate being substantially circular in shape, wherein said casing including said support plate is a one-piece, integrally-formed construction having a cylindrical wall portion extending rearwardly from said opposite side of said support plate to define an interior portion adapted to house said mounting means, s aid Bourdon element and said mechanical movement, said interior portion also being adapted to be filled with a protective fluid, said housing means further including sealing means operatively engaging the rear of said wall portion for preventing the escape of said protective fluid from said interior portion, the fluid being confined within said interior portion by said circular support plate, said cylindrical wall portion and said sealing means, said sealing means including a "blow-out" back cover to act as a safety release to prevent the build up of excessive pressures within the instrument, said sealing means including a dual purpose flexible member for both sealing said back cover to normally prevent the escape of said fluid from said interior portion and for expanding and contracting to compensate for temperature variations, said rearwardly facing cylindrical wall including an annular shoulder on the inside thereof adjacent the distal end of said wall; said flexible member including a generally circular, dish-shaped diaphragm having a peripheral lip and its concave portion facing away from said support plate; said back cover including a relatively firm yet resilient material and is generally circular in shape, said cover includes a central portion, a radially outer peripheral portion whose annular inner surface is adapted to be urged against said distal end of said cylindrical wall, and an annular hump-shaped portion coupling the central portion to the outer portion, the peak of said hump-shaped portion facing said support plate and the radially outer side thereof curving to become integral with said outer portion; and said sealing means further including a substantially squared, generally S-shaped bracket having one end rigidly secured to said opposite side of said support plate and the opposite end centered over the back of said interior portion and adapted to be secured to the central portions of said diaphragm and said back cover so as to normally engage the peripheral lip of said dish-shaped diaphragm and the portion radially adjacent thereto with said annular hump-shaped portion and the curved radially outer side thereof to compress said peripheral lip and the portion radially adjacent thereto against said inside annular shoulder and the inside surfaces adjacent thereto to form a fluid-tight seal therebetween, said "blow-out" back cover being responsive to a predetermined unsafe amount of internal pressure exerted against said cover by said diaphragm for flexing to move said hump-shaped annular portion outwardly from said support plate thereby allowing said peripheral lip to break the seal with said inside annular shoulder to relieve the internal pressure.

29. The improved instrument of claim 28 wherein said dish-shaped diaphragm includes a central aperture and a raised annular ring encircling said aperture and extending away from said support plate, said raised annular ring being integral with said diaphragm and wherein said back cover includes an aperture at the center of said central portion and recess-forming means disposed annularly around said aperture and opening toward said support plate for receiving said raised annular ring when said back cover and said diaphragm are secured to said bracket for forming a fluid-tight radial seal therebetween.

30. In a condition responsive indicating instrument which includes a dial having a plurality of indicia thereon, pointer means adapted to indicate a distinct one of said indicia for each correspondingly distinct condition measured by the instrument, inlet means coupled to the media whose condition is being measured, a Bourdon element coupled to said inlet means and responsive to a given condition of said media for effecting a predetermined motion indicative thereof and a mechanical movement coupled between said Bourdon element and said pointer means for translating the condition-indicative motion of said Bourdon element into corresponding dial indications by said pointer means, an improved housing means including a casing having a support plate, said dial being secured to one side of support plate, mounting means secured to the opposite side of said support plate for mounting said mechanical movement so as to isolate same from external forces applied to said casing, said support being substantially circular in shape, wherein said casing including said support plate is a one-piece, integrally-formed construction having a cylindrical wall portion extending rearwardly from said opposite side of said support plate to define an interior portion adapted to house said mounting means, said Bourdon element and said mechanical movement, said interior portion also being adapted to be filled with a protective fluid, said housing means including sealing means operatively engaging the rear of said wall portion for preventing the escape of said protective fluid from said interior portion, the fluid being confined within said interior portion by said circular support plate, said cylindrical wall portion and said sealing means, said sealing means including a "blow-out" back cover to act as a safety release to prevent the build up of excessive pressures within the instrument, said sealing means including a dual purpose flexible member for both sealing said back cover to normally prevent the escape of said fluid from said interior portion and for expanding and contracting to compensate for temperature variations, said rearwardly facing cylindrical wall including an annular shoulder on the inside thereof adjacent the distal end of said wall; said flexible member including a generally circular, dish-shaped diaphragm having a peripheral lip and its concave portion facing away from said support plate; said back cover including a relatively firm yet resilient material and is generally circular in shape, said cover includes a central portion, a radially outer peripheral portion whose annular inner surface is adapted to be urged against said distal end of said cylindrical wall, and an annular hump-shaped portion coupling the central portion to the outer portion, the peak of said hump-shaped portion facing said support plate and the radially outer side thereof curving to become integral with said outer portion; and said sealing means further including a bracket having one end rigidly secured to the rear side of said inlet means and the opposite end centered over the back of said interior portion and adapted to be secured to the central portions of said diaphragm and said back cover so as to normally engage the peripheral lip of said dish-shaped portion and the curved radially outer side thereof to compress said peripheral lip and the portion radially adjacent thereto against said inside annular shoulder and the inside surfaces adjacent thereto to form a fluid-tight seal therebetween, said "blow-out" back cover being responsive to a predetermined unsafe amount of internal pressure exerted against said cover by said diaphragm for flexing to move said hump-shaped annular portion outwardly from said support plate thereby allowing said peripheral lip to break the seal with said inside annular shoulder to relieve the internal pressure.

* * * * *